E. W. GRANT.
SPRAYING COMPOUND MIXER.
APPLICATION FILED JAN. 23, 1913.
1,122,735.
Patented Dec. 29, 1914.
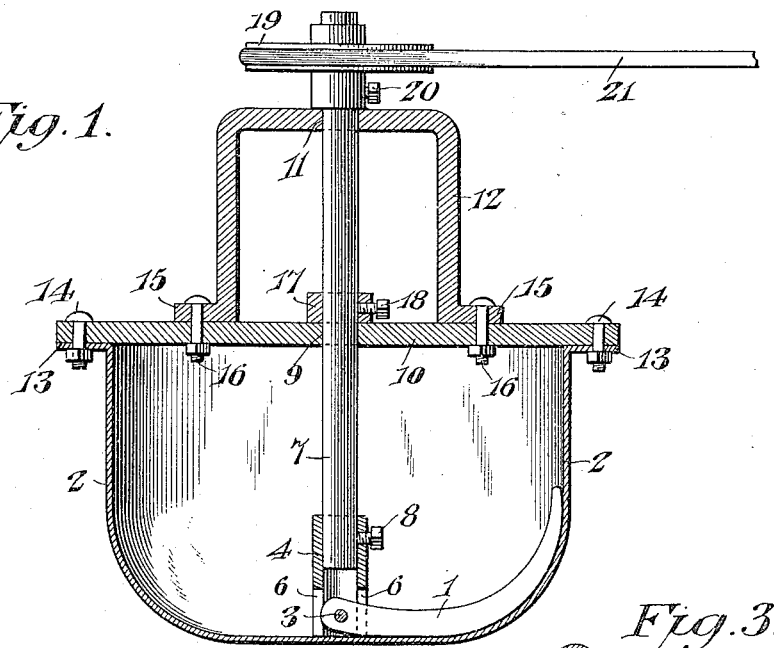
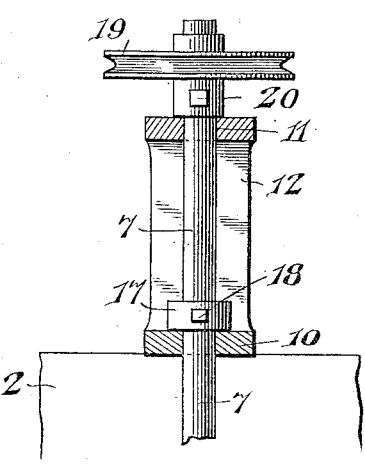
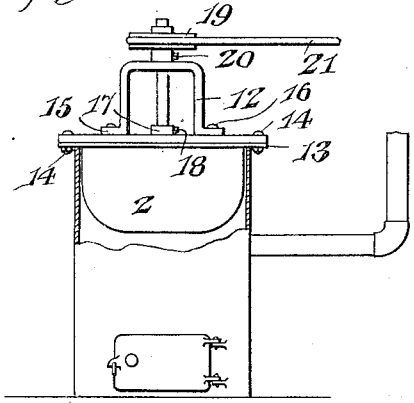
WITNESSES
Edward W. Grant, INVENTOR

UNITED STATES PATENT OFFICE.

EDWARD W. GRANT, OF WINCHESTER, VIRGINIA, ASSIGNOR OF ONE-HALF TO NEWTON J. WIGGINTON, OF WINCHESTER, VIRGINIA.

SPRAYING-COMPOUND MIXER.

1,122,735.   Specification of Letters Patent.   Patented Dec. 29, 1914.

Application filed January 23, 1913. Serial No. 743,833.

*To all whom it may concern:*

Be it known that I, EDWARD W. GRANT, a citizen of the United States, residing at Winchester, in the county of Frederick and State of Virginia, have invented a new and useful Spraying-Compound Mixer, of which the following is a specification.

The invention relates to improvements in devices for mixing spraying compounds.

The object of the present invention is to improve the construction of spraying compound mixers, and to provide a simple and inexpensive device designed for mixing such substances as sulfur and lime, and equipped with a combined scraping and stirring arm, arranged to rotate within a receptacle, and adapted to lie yieldably against the bottom and lower portions of the sides thereof, and capable of scraping the solid portions of the mixture from the said bottom and sides of the receptacle and of thoroughly agitating the mixture and of producing a homogeneous substance of a high quality.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claim, may be resorted to without departing from the spirit or sacrificing any of the advantages of the invention.

In the drawing:—Figure 1 is a central vertical sectional view of a mixing device, constructed in accordance with this invention. Fig. 2 is a similar view of the upper portion of the device, taken at right angles to Fig. 1. Fig. 3 is a detail perspective view of the scraping and stirring arm. Fig. 4 is an elevation, partly in section, showing the mixer arranged on a furnace.

Like numerals of reference designate corresponding parts in all the figures of the drawing.

In the accompanying drawing in which is illustrated the preferred embodiment of the invention, 1 designates a combined scraping and stirring arm extending from the central portion of the bottom of a vessel or other receptacle 2 and curved longitudinally to conform to the configuration of the receptacle, which is rounded at the bottom. The combined scraping and stirring arm 1 is pivoted by a pin 3 in the lower portion of a sleeve 4, which is provided at opposite sides of the said lower portion with slots 6. The inner end of the scraping and stirring arm operates in the slots to permit the arm to swing upwardly and downwardly, and the said arm when rotated is held against the bottom and sides of the vessel by gravity and is capable of scraping the lumps from the walls of the vessel, and is adapted to pass over hard lumps and by continuously engaging the same to reduce the size of the lump until the material adhering to the bottom and walls of the vessel is entirely removed therefrom. The pin or pivot 3 pierces the inner end of the combined scraping and stirring arm and the opposite sides of the slotted lower portion of the sleeve.

The sleeve 4 is fitted on the lower end of a central vertical shaft 7 and is adjustably secured to the same by a set screw 8, mounted in a threaded perforation in one side of the sleeve and engaging the side of the shaft. The adjustable connection between the sleeve and the shaft enables the combined scraping and stirring arm to be adjusted to rest properly upon the bottom of the vessel and by means of it, the arm may be easily and quickly applied to and removed from the shaft. Any other suitable means, however, may be employed for securing the sleeve to the lower end of the shaft 7.

The vertical shaft 7 is journaled in a suitable bearing opening 9 of a horizontal cross bar 10 and in a bearing opening 11 in the upper portion of a bracket or support 12. The sides of the vessel are provided at their upper edges with an outwardly extending horizontal flange 13 to which the terminal portions of the cross bar 10 are secured by bolts 14, or other suitable fastening means. The bearing bracket 12 is approximately inverted U-shaped and the sides have outwardly extending attaching portions or ears 15, which are secured by bolts 16 upon the upper face of the cross bar 10. The vertical shaft is equipped with a set collar 17, having a set screw 18 to engage the shaft and resting upon the cross bar 10 and adapted to support the shaft on the frame formed by the bar and the bearing bracket. The upper end of the shaft receives a pulley 19 provided at its hub with a set screw 20 to engage the shaft and having its hub seated upon the top of the bearing bracket 12. The pulley, which is preferably grooved, is connected by a belt 21 with a motor or other suitable power (not shown) for rotating the vertical shaft. When the shaft is rotated, the combined stirring and scraping arm is carried around the vessel, and the free pivotal action of the said arm enables the same should it encounter a hard lump to ride over the same without breaking or otherwise injuring the apparatus.

What is claimed is:—

A mixer including a receptacle, a vertical shaft mounted for rotary movement in the receptacle, a sleeve secured to the lower end of the shaft and extending below the same and having a lower slotted portion, and a combined scraping and stirring arm pivoted at its inner end within the slotted portion of the sleeve and arranged to yieldably rest against the bottom and sides of the receptacle and having a free upwardly swinging movement.

In testimony, that I claim the foregoing as my own, I have hereto affixed my signature in the presence of two witnesses.

EDWARD W. GRANT.

Witnesses:
 JOHN M. STECK,
 PHIL. H. GOLD.

Copies of this patent may be obtained for five cents each, by addressing the "Commissioner of Patents, Washington, D. C."